Jan. 21, 1936.   L. E. LA BRIE   2,028,613
BRAKE
Filed Sept. 20, 1932   2 Sheets-Sheet 1

INVENTOR.
LUDGER E. LA BRIE
BY
McConkey & Smith
ATTORNEYS

Jan. 21, 1936. L. E. LA BRIE 2,028,613
BRAKE
Filed Sept. 20, 1932 2 Sheets-Sheet 2
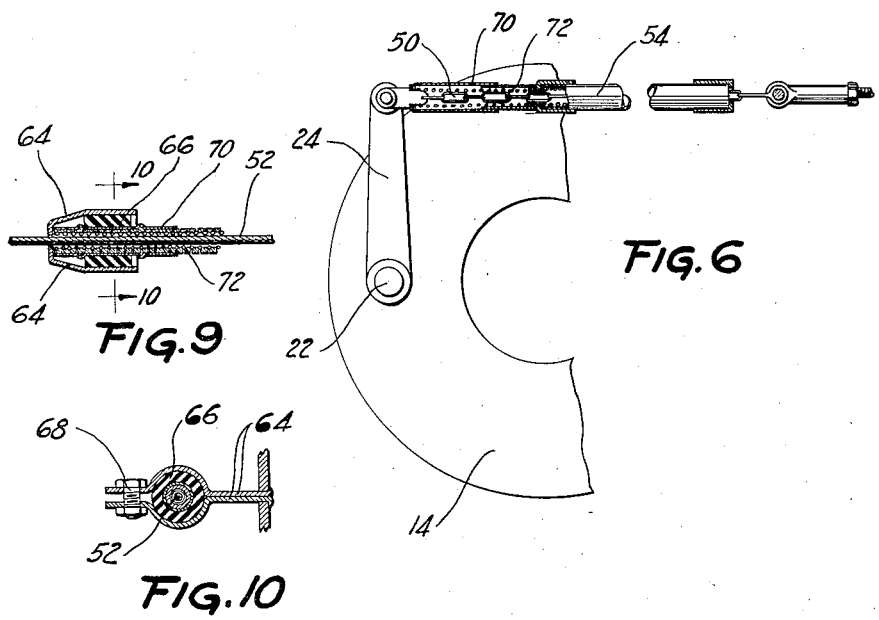
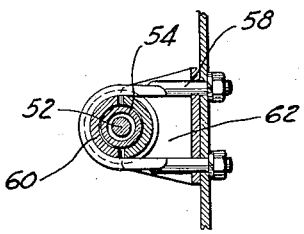
INVENTOR.
LUDGER E. LA BRIE
BY McConkey & Smith
ATTORNEYS.

Patented Jan. 21, 1936

2,028,613

UNITED STATES PATENT OFFICE 2,028,613

BRAKE

Ludger E. La Brie, South Bend, Ind., assignor to Bendix Aviation Corporation, South Bend, Ind., a corporation of Delaware Application September 20, 1932, Serial No. 634,046

6 Claims. (Cl. 188—78)

This invention relates to brakes, and is illustrated as embodied in an internal expanding automobile brake having novel operating means of the "cable and conduit" or "Bowden type".

An object of the invention is to provide a simplified brake of the fixed anchorage type, provided with novel means for increasing its effectiveness beyond that of the usual fixed anchorage brake. Preferably this is accomplished by the use of anchoring links, inclined to give them a wedging or self-energizing action. In the particular arrangement illustrated, there are two shoes, actuated by applying means such as a cam, and the links of the two shoes are oppositely inclined with respect to each other, being pivoted to the shoes at the ends nearest the cam, and mounted at their other ends (furthest from the cam) on fixed pivots or anchors shown as carried by the brake backing plate.

The above and other objects and features of the invention, including novel shoe-positioning devices and an improved form of "Bowden" control, will be apparent from the following description of the illustrative embodiment shown in the accompanying drawings, in which:

Figure 6 is an inside elevation, partly broken away, showing the novel Bowden control and its connection to the brake;

Figure 7 is a horizontal section showing an alternative form of "Bowden" control;

Figure 8 is a section on the line 8—8 of Figure 7, showing the means for securing one end of the Bowden conduit;

Figure 9 is a section showing an alternative means for securing the end of the Bowden conduit; and Figure 10 is a section on the line 10—10 of Figure 9, showing the attachment to the vehicle frame, or to the brake backing plate, as the case may be.

Figure 1:
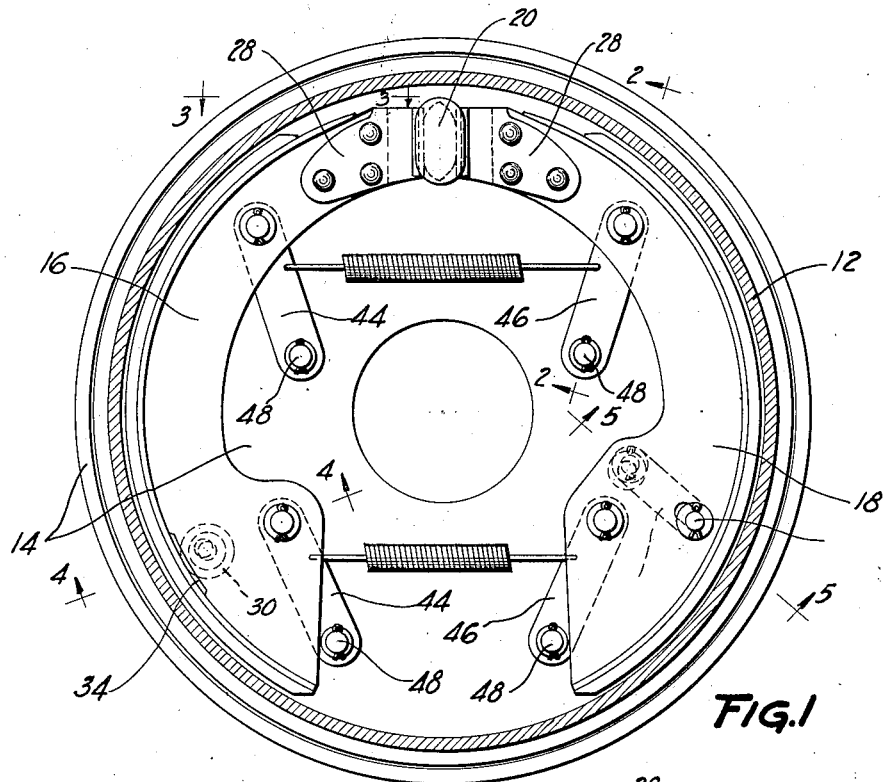
Figure 1 is a section through the brake, just inside the head of the brake drum, and showing the brake shoes in side elevation.
Figures 2, 3, 5:
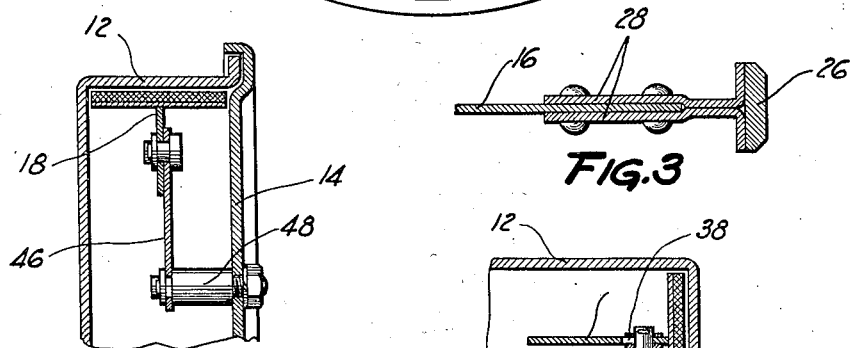
Figure 2 is a partial section, on the line 2—2 of Figure 1, showing one of the anchoring links.
Figure 3 is a partial section through the end of one of the shoes, on the line 3—3 of Figure 1.
Figure 5 is a partial section, on the line 5—5 showing another of the shoe-positioning devices.
Figure 4:
Figure 4 is a partial section, on the line 4—4 of Figure 1, showing one of the shoe-positioning devices.

The brake selected for illustration includes a rotatable drum 12, at the open side of which is a support such as a backing plate 14. The drum and the backing plate define between them a substantially closed brake chamber, inclosing the brake friction means which is here shown as comprising a pair of shoes 16 and 18.

The shoes are shown as actuated by applying means such as a cam 20 on a cam-shaft 22 (Figure 6) operated by a cam-lever 24 arranged externally of the brake. The cam may act on cam thrust plates 26, one for each shoe, each bridging across a pair of L-shaped stampings 28 arranged and riveted back to back with the end of the shoe web embraced between them.

Shoe 16 is shown provided with a positioning device, determining its released position, in the form of a roller 30 mounted on an adjustable eccentric pivot 32 carried by the backing plate. Roller 30 engages the inner face of the rim of shoe 16, and is laterally engaged by a portion 34 struck inwardly from the rim of the shoe. Shoe 18 is shown provided with a positioning device, determining its released position, and including a part 36 extending through a slot 38 in the shoe web, and carried by a movable link or the like 40 pivoted eccentrically on an adjustable eccentric post 42 mounted on the backing plate. The released position of the shoe is determined by engagement of the slot 38 with the part 36.

According to an important feature of the invention, the shoes are anchored on pairs of inclined anchor links 44 and 46, the links of each pair being substantially parallel to each other, but the links 44 being inclined oppositely to the links 46. The links are pivoted to the shoes at the ends nearest the cam, and to fixed pivots 48 carried by the backing plate at the ends furthest from the cam.

When the brake is applied by cam 20, the shoes are swung by a parallel link motion on the pairs of links 44 and 46 toward the drum against the resistance of return springs 47 and 49 connected between the opposite links, and one or the other of them is wedged effectively against the drum by a self-energizing action.

The cam lever 24 may be operated by a flexible steel chain 50 (Figure 6) or cable 52 (Figure 7) extending through a flexible Bowden-type conduit 54. The conduit 54 may be secured to the brake backing plate 14 at one end, and to the vehicle frame 56 at its other end, by U-bolts or the like 58, encircling fittings 60 mounted on the conduit and drawing them tightly against clamp brackets 62. In Figures 9 and 10 a substitute conduit clamping means is shown, in this case including a pair of bracket members 64 hooked into the backing plate (and into the vehicle frame) and embracing between them a fitting 66 on the conduit and clamped thereagainst by tightening a bolt 68.

The exposed end of the chain 50, or the cable 52, is preferably housed in a novel telescoping tubular metal housing 70 arranged between the lever 24 and the conduit 54, and normally held extended by a spring 72.

While one illustrative embodiment of my invention has been described in detail herein, it is not my intention to limit the scope of the invention to that particular embodiment, or otherwise than by the terms of the appended claims.

I claim:

1. A brake comprising a pair of shoes each provided with a pair of inclined parallel-motion anchoring links.

2. A brake comprising a pair of shoes each provided with a pair of inclined parallel-motion anchoring links, the links of one shoe being inclined oppositely to those of the other.

3. A brake comprising a pair of shoes, applying means engaging adjacent ends of the shoes, and inclined anchor links for the shoes pivoted to the shoes at the ends nearest the applying means and mounted on fixed pivots at the ends furthest from the pivots.

4. A brake comprising a pair of shoes, applying means engaging adjacent ends of the shoes, and inclined anchor links for each of the shoes pivoted to the shoes at the ends nearest the applying means and mounted on fixed pivots at the ends furthest from the pivots, the links pivoted to each shoe being substantially parallel.

5. A brake having a friction member formed with a portion offset inwardly beyond its inner face, and a positioning device engaging said inner face and laterally engaged by said portion.

6. A brake having a friction device with a generally-radial slot, an adjustable eccentric arranged adjacent said device, and a member mounted on the eccentric and having a positioning part extending into said slot, the engagement of the slot and said part determining the released position of said device.

LUDGER E. LA BRIE.